United States Patent
Mckitterick

(10) Patent No.: US 10,473,757 B2
(45) Date of Patent: Nov. 12, 2019

(54) MOVING TARGET IDENTIFICATION WITHOUT SPECIAL RADAR MODE

(71) Applicant: Honeywell International Inc., Morris Plains, NJ (US)

(72) Inventor: John B. Mckitterick, Columbia, MD (US)

(73) Assignee: Honeywell International Inc., Morris Plains, NJ (US)

( * ) Notice: Subject to any disclaimer, the term of this patent is extended or adjusted under 35 U.S.C. 154(b) by 368 days.

(21) Appl. No.: 15/383,811

(22) Filed: Dec. 19, 2016

(65) Prior Publication Data
US 2018/0172815 A1   Jun. 21, 2018

(51) Int. Cl.
| | |
|---|---|
| *G01S 7/35* | (2006.01) |
| *G01S 13/34* | (2006.01) |
| *G01S 13/93* | (2006.01) |
| *G01S 13/94* | (2006.01) |

(52) U.S. Cl.
CPC .......... *G01S 7/354* (2013.01); *G01S 13/343* (2013.01); *G01S 13/9303* (2013.01); *G01S 13/94* (2013.01); *G01S 2007/356* (2013.01)

(58) Field of Classification Search
CPC ........ G01S 7/292; G01S 7/2921; G01S 7/354; G01S 13/50; G01S 13/343; G01S 13/53; G01S 13/536
See application file for complete search history.

(56) References Cited

U.S. PATENT DOCUMENTS

| | | | | |
|---|---|---|---|---|
| 4,079,377 A | * | 3/1978 | zur Heiden | ........... G01S 13/343 342/109 |
| 4,743,910 A | * | 5/1988 | Hill | ........... G01S 13/584 342/159 |
| 5,270,720 A | | 12/1993 | Stove | |

(Continued)

FOREIGN PATENT DOCUMENTS

WO    2009147406 A1    12/2009

OTHER PUBLICATIONS

Brooker, "Understanding Millimetre Wave FMCW Radars," 1st International Conference on Sensing Technology, Nov. 21-23, 2005, 6 pp.

(Continued)

*Primary Examiner* — Peter M Bythrow
(74) *Attorney, Agent, or Firm* — Shumaker & Sieffert, P.A.

(57) ABSTRACT

This disclosure is directed to techniques for an FMCW radar system to determine an unambiguous radial velocity of a target. The radar system measures the Doppler shift in the received return signal reflected from the target, while the radar system simultaneously performs normal surveillance functions. Such a radar system may digitize the beat frequency that results from mixing the received return signal from a target the transmitted signal for a given frequency ramp. The radar system may divide the usable digitized samples at the output of an analog-to-digital converter (ADC) into a number of subsets and analyze the frequencies in each subset. Because each subset of samples covers a time interval that may be substantially less than the period of each frequency ramp, the radar system may extract without ambiguity the Doppler velocity of a target within as little as the period of single frequency ramp.

20 Claims, 6 Drawing Sheets

(56) References Cited

U.S. PATENT DOCUMENTS

| | | | | |
|---|---|---|---|---|
| 5,339,082 | A * | 8/1994 | Norsworthy | F41G 7/2226 342/128 |
| 5,751,240 | A | 5/1998 | Fujita et al. | |
| 5,867,117 | A * | 2/1999 | Gogineni | G01S 13/0209 342/128 |
| 5,920,280 | A | 7/1999 | Okada et al. | |
| 6,297,764 | B1 * | 10/2001 | Wormington | G01S 7/2921 342/101 |
| 7,394,422 | B2 | 7/2008 | Nohmi | |
| 8,884,814 | B2 | 11/2014 | Wen et al. | |
| 9,354,304 | B2 | 5/2016 | Kirsch et al. | |
| 2008/0088503 | A1 * | 4/2008 | Beasley | G01S 7/4056 342/200 |
| 2008/0218406 | A1 * | 9/2008 | Nakanishi | G01S 7/354 342/192 |
| 2009/0251361 | A1 * | 10/2009 | Beasley | G01S 7/354 342/169 |
| 2012/0119938 | A1 * | 5/2012 | Abe | G01S 7/35 342/107 |
| 2015/0226848 | A1 * | 8/2015 | Park | G01S 13/584 342/70 |
| 2015/0323649 | A1 * | 11/2015 | Lee | G01S 13/04 342/27 |
| 2016/0103206 | A1 * | 4/2016 | Pavao-Moreira | G01S 13/08 342/104 |
| 2016/0124086 | A1 * | 5/2016 | Jansen | G01S 13/582 342/93 |
| 2016/0131752 | A1 * | 5/2016 | Jansen | G01S 13/343 342/27 |
| 2016/0223645 | A1 * | 8/2016 | Kim | G01S 7/023 |
| 2017/0131393 | A1 * | 5/2017 | Schoor | G01S 7/354 |
| 2017/0131396 | A1 * | 5/2017 | Schoor | G01S 7/354 |
| 2017/0168153 | A1 * | 6/2017 | Kozuki | G01S 13/341 |

OTHER PUBLICATIONS

Hyun et al., "Method to Improve Range and Velocity Error Using De-interleaving and Frequency Interpolation for Automotive FMCW Radars," International Journal of Signal Processing, Image Processing and Pattern Recognition, vol. 2, No. 2, Jun. 2009, 12 pp.

Jenn, "RADAR Fundamentals," Naval Postgraduate School, retrieved from http://faculty.nps.edu/jenn/Seminars/RadarFundamentals.pdf on Sep. 15, 2016, 51 pp.

Vossiek et al., "Novel Non-Linear FMCW Radar for Precise Distance and Velocity Measurements," Microwave Symposium Digest, Jun. 1998, IEEE Xplore, 4 pp.

Yu et al., "Moving Target Detection for FMCW Radar," IEEE, Oct. 2011, 4 pp.

Otto, Principle of FMCW Radars, Atmos, Delft University of Technology, retrieved from http://www.slideshare.net/tobiasotto/principle-of-fmcw-radars, on Sep. 15, 2016, 21 pp.

Radar Basics—Pulse Compression, "Intrapulse Modulation and Pulse Compression," Radar Basics, retrieved from http://www.radartutorial.eu/08.transmitters/intrapulse%20Modulation_en.html on Sep. 12, 2016, 4 pp.

Radar Basics—PRF and PRT, "Pulse Repetition Frequency," Radar Basics, retrieved from http://www.radartutorial.eu/01.basics/Pulse%20Repetition%20Frequency%20(PRF).en.html, Sep. 12, 2016, 1 pp.

Croci, "Radar Basics," retrieved from http://www.alphalpha.org/radar/intro_e.html, last updated Oct. 6, 2002, 7 pp.

Yildirim, "Millimeter Wave Radar Design Considerations," Journal of Electrical and Electronics Engineering, vol. 3 No. 2, Jun. 6, 2003, 4 pp.

Davis et al., "Radar Frequencies and Waveforms," 12th Annual International Symposium on Advanced Radio Technologies, Georgia Tech Research Institute, retrieved from http://www.its.bldrdoc.gov/media/31078/DavisRadar_waveforms.pdf, on Sep. 12, 2016, 50 pp.

Kodituwakku et al., "Detection of Fast Moving and Accelerating Targets Compensating Range and Doppler Migration," Australian Government Department of Defence, Defence Science and Technology Organisation, DSTO-TR-2978, Jun. 2014, 36 pp.

* cited by examiner

MOVING TARGET IDENTIFICATION WITHOUT SPECIAL RADAR MODE

TECHNICAL FIELD

The disclosure relates to frequency modulated continuous wave radars.

BACKGROUND

Radars extract a variety of information from a scene in addition to the measurement of reflected intensities. One example of such additional information is the identification of moving objects, for example, in the air or on the ground. Some pulsed radar systems include a special mode, sometimes referred to as Moving Target Indication (MTI) mode or Ground Moving Target Indicator (GMTI) mode, to determine that targets are moving. In an MTI or GMTI mode, a pulsed radar system may slow down the azimuth sweep of the radar, so that the radar dwells for an extended period of time at each azimuth angle. This allows the pulsed radar system to determine of the radial velocity of the target towards or away from the pulsed radar system. However, MTI/GMTI mode may degrade the quality of the measurements of reflected radar intensities. Also, the pulsed radar system may not be able to utilize other desired modes while utilizing MTI/GMTI mode.

A frequency modulated continuous wave (FMCW) radar operates in a different manner than a pulsed radar. An FMCW radar modulates the transmitted signal with, for example a linear frequency ramp. The frequency ramp may be repeated at a selected interval. The FMCW radar mixes the received return signal with the transmitted signal. Because the received return signals are time-delayed by the time-of-flight from the radar to the target and back, the output of the mixer is a beat signal whose frequency is proportional to the distance to the target. The frequencies in the beat signal may be much lower than the baseband frequency of the radar. An FMCW radar may use an analog-to-digital converter (ADC) to sample the beat signal. The FMCW radar may determine the frequencies in the spectrum of the digitized beat signal by using a fast Fourier transform (FFT).

SUMMARY

In general, this disclosure is directed to techniques for an FMCW radar to determine an unambiguous radial velocity of a target. Using the techniques of this disclosure a radar system may determine a target's velocity by measuring the Doppler shift in the received return reflections from the target while the radar system simultaneously performs normal surveillance functions.

In one example, the disclosure is directed to a radar system comprising: radar transmit electronics configured to transmit a radar signal and radar receive electronics configured to: sample a radar return signal received from a target, determine an interval from the start of a first frequency ramp of the radar return signal, wherein the portion of the radar return signal corresponding to the interval includes portions of the radar return signal other than the first frequency ramp, determine a plurality of usable samples for the first frequency ramp, wherein the plurality of usable samples excludes samples of the radar return signal corresponding to the interval, determine a subset of the plurality of usable samples, determine one or more frequencies present in the subset of the plurality of usable samples, and determine a Doppler velocity of the target based at least in part on the one or more frequencies present in the subset of the plurality of usable samples.

In another example, the disclosure is directed to a method of determining velocity, the method comprising A method of determining velocity, the method comprising: receiving a radar return signal from a target, wherein the radar return signal comprises a first frequency ramp, determining an interval, $\delta t$, from the start of the first frequency ramp of the radar return signal, wherein the radar return signal corresponding to the interval, $\delta t$, includes portions of the radar return signal other than the first frequency ramp, determining a plurality of usable samples for the first frequency ramp, wherein the plurality of usable samples exclude samples of the radar return signal corresponding to the interval, $\delta t$, determining a subset of the plurality of usable samples, determining one or more frequencies present in the subset of the plurality of usable samples, and determining a Doppler velocity of the target based at least in part on the one or more frequencies present in the subset of the plurality of usable samples.

In another example, the disclosure is directed to a radar system comprising: means for receiving a radar return signal from a target, wherein the radar return signal comprises a first frequency ramp, means for determining an interval, $\delta t$, from the start of the first frequency ramp of the radar return signal, wherein the radar return signal corresponding to the interval, $\delta t$, includes portions of the radar return signal other than the first frequency ramp, means for determining a plurality of usable samples for the first frequency ramp, wherein the plurality of usable samples exclude samples of the radar return signal corresponding to the interval, $\delta t$, means for determining a subset of the plurality of usable samples, means for determining one or more frequencies present in the subset of the plurality of usable samples, and a means for determining a Doppler velocity of the target based at least in part on the one or more frequencies present in the subset of the plurality of usable samples.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
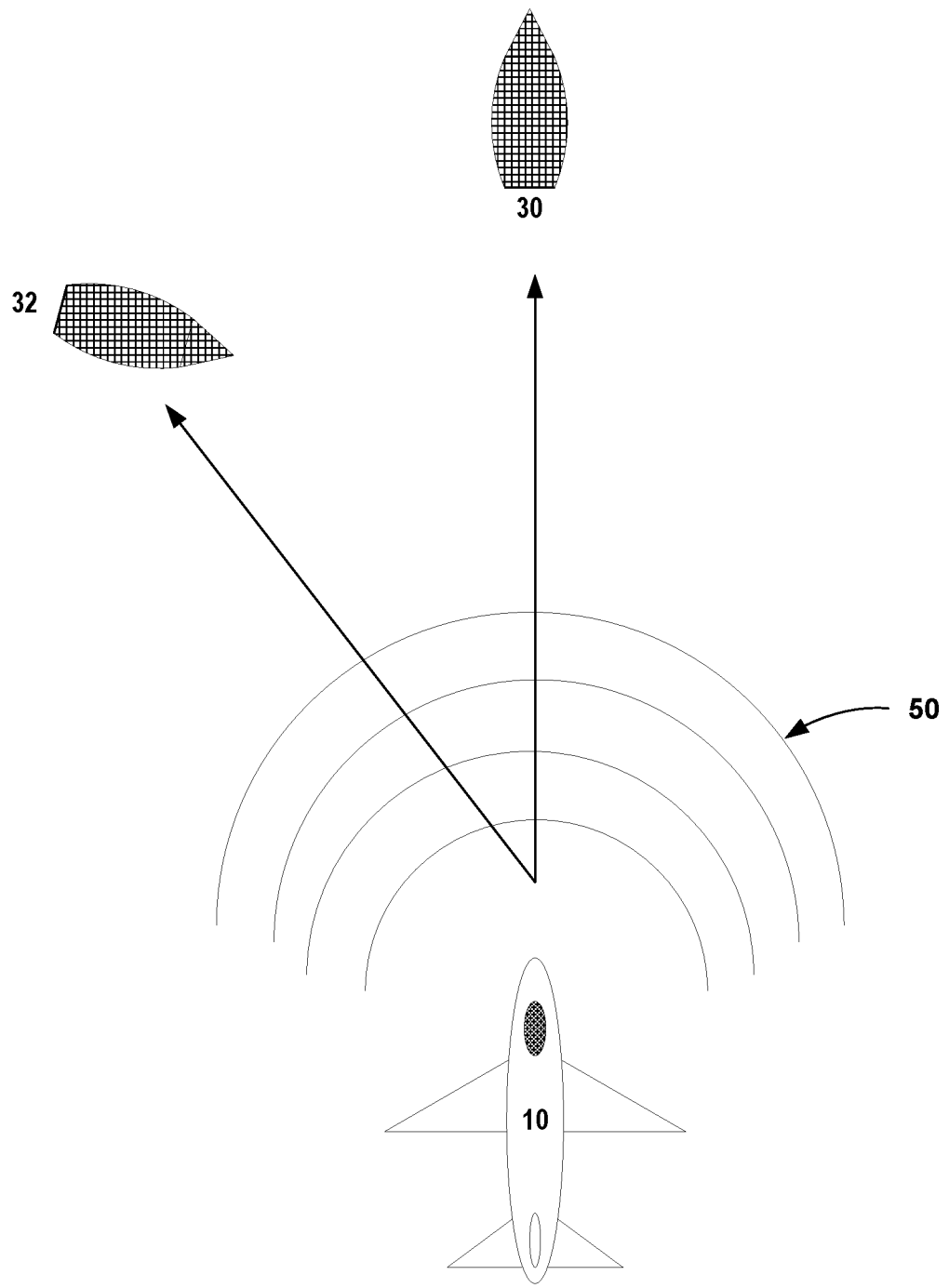
FIG. 1 is a conceptual diagram illustrating an example radar system that determines an unambiguous Doppler radial velocity of a target in accordance with one or more techniques of this disclosure.

This disclosure is directed to techniques for configuring an FMCW radar to determine an unambiguous radial velocity of a target. Using the techniques of this disclosure a radar system may determine a target's velocity by measuring the Doppler shift in the received return signal reflected from the target, while the radar system also simultaneously performs normal surveillance functionality. Such a radar system may digitize the beat signal that results from mixing the received return signal from a target with a portion of the transmitted signal for a given frequency ramp. The radar system may divide the usable digitized samples at the output of an analog-to-digital converter (ADC) into a number of subsets and analyze the frequencies in each subset. Each subset of samples is offset from the other subsets by a multiple of the ADC sample period. For example, a first subset of usable samples may start at sample 30 and end at sample 100. A second subset of the same frequency ramp may start at sample 35 and end at sample 105.

By determining the frequencies in a series of subsets, the radar system according to the techniques of this disclosure may sample the phase evolution of the received return signal. Because each subset of samples is offset from the other subsets by a time interval that may be substantially less than the period of each frequency ramp, the radar system may extract without ambiguity the Doppler velocity of a target within as little as two frequency ramps. Also, the techniques of this disclosure downconvert the reflected return signal and extract and digitize the beat signal before dividing the samples into subsets and determining the frequencies within each subset. The velocity signal processing happens while the radar system continues to transmit and receive radar signals. Therefore, the radar system may continue normal surveillance and other functions and keep the radar frequency sweep parameters the same throughout this operation. Radar frequency sweep parameters may include the baseband frequency, frequency ramp period and repetition rate, modulation frequencies and similar parameters. In other words, analyzing the velocity of one or more targets using the techniques of this disclosure has minimal impact on other functions of the radar system.

Existing radar systems can determine the velocity from the differences in the phases between the transmitted radar signal and the received radar signal. For example, comparing two sequential radar pulses from a pulsed radar, the two signals reflected from the target differ only in phase, with the amount of the phase difference between the two signals being proportional to twice the distance travelled by the target during the time between the two pulses. Phase differences can only be measured modulo $2\pi$, thus resulting in several possible and ambiguous solutions for the target velocity. A pulsed radar system may take the multiple measurements of each reflected returned signal pulse at fixed time intervals corresponding to the pulse repetition frequency (PRF). PRF may also be referred to as pulse repetition rate (PRR).

For a pulsed radar, the signal at each measurement can be written as $Ae^{-i\omega t}$, where the frequency $\omega$ is proportional to the velocity of the target and inversely proportional to the wavelength of the radar, and t is the time of the measurement. For a fixed PRF and therefore fixed time intervals between measurements, i.e. pulse repetition interval (PRI), the radar system may use an FFT to extract the value of $\omega$. However, even with multiple measurements, the measured frequency can be an alias of a higher frequency. Resolving this Doppler ambiguity, may be done by significantly extending the measurements in time.

Multiple measurements over an extended period may somewhat reduce the ambiguity in the solution for target velocity, but present several challenges. These include radar coherency over time, a target may move outside a given range bin over an extend time or the radar may inhibit other radar functions during this time. Additionally, where the time between measurements is relatively large, such as the time between each radar pulse, or PRI, the Doppler ambiguity is more difficult to resolve. The Doppler ambiguity is inversely related to the time between measurements, or $1/\Delta T_{meas}$. A large $\Delta T_{meas}$ means the differences between the velocity solutions are small, and therefore difficult to resolve which is the accurate velocity. The smaller the $\Delta T_{meas}$, the larger the differences between the velocity solutions and the easier to distinguish between ambiguous velocity solutions.

A pulsed radar may change the PRF one or more times and make additional sweeps of the target. Each different PRF results in a different Doppler ambiguity. By comparing the measurements at the different PRFs, a pulsed radar may determine which velocity solution is the most likely actual target velocity. This may require the pulsed radar to operate in a special mode of some sort, similar to MTI mode, which may limit the pulsed radar system's normal surveillance function, or other radar functions.

Some existing FMCW radar systems may conduct an MTI or GMTI analysis by analyzing the return signals from sequential frequency ramps in exactly the same manner as with a pulsed radar. In some examples, sequential frequency ramps may be called sequential chirps. The frequency ramps have a predetermined repetition rate, similar to a pulsed radar's PRF. The approach of examining FMCW sequential frequency ramps or chirps suffers from all of the issues that the pulsed radar does, such as relatively large $\Delta T_{meas}$ and Doppler velocity ambiguity that is difficult to distinguish. With this approach the FMCW radar offers no advantage over the pulsed radar.

An FMCW radar according to the techniques of this disclosure may take advantage of the ADC output to provide information that an existing pulsed radar system cannot. In the FMCW radar, the transmitted frequency ramp extends over a period T, and the received signal also extends over the same period T. The received signal is delayed for as long as the time for the radar signal to travel to the target and back. The ADC samples the downconverted received signal and outputs a series of samples. The receiver electronics process at least two subsets of samples from each frequency ramp. Each subset may be the same number of samples, but each subset is offset in time. By processing at least two time offset subsets from at least two frequency ramps, a radar system according to this disclosure may unambiguously determine the Doppler velocity for a target. The velocity results will have good noise performance, and because radar system does the processing after it receives the return signal, determining the velocity may have minimal impact on the other radar functions.

FIG. 1 is a conceptual diagram illustrating an example radar system that determines an unambiguous Doppler radial velocity of a target in accordance with one or more techniques of this disclosure. FIG. 1 depicts the radar system installed on a moving aircraft as one example, but the radar system may be installed in any type of vehicle, or in a stationary ground installation. In the context of this disclosure, the term unambiguous should not be interpreted to mean that the Doppler radial velocity is determined with perfect precision or without any margin for error. Instead, unambiguous, in the context of this disclosure, means that that the radar system may be able to determine a single solution within a certain margin for error, rather than multiple solutions within a margin for error. For example, when determining Doppler radial velocities, existing radars determine multiple solutions with, for example, different Doppler radial velocities resulting from a modulo $2\pi$ difference in phase. This may result in several ambiguous velocity solutions for a target. An FMCW radar according to this disclosure determines Doppler radial velocities with large differences between modulo $2\pi$ solutions. Therefore, the techniques of this disclosure discard unfeasible solutions to unambiguously determine a feasible Doppler radial velocity solution. This will be explained in more detail in FIG. 2 below.

Aircraft 10 includes a radar system. The radar system in aircraft 10 may, for example, be radar system 300 described below with respect to FIG. 3 or may be some other similarly configured radar system. The radar system of aircraft 10 transmits a radar signal 50. The transmitted radar signal 50 reflects from targets 30 and 32. The radar system receives a portion of the reflected signal and processes the received signal to determine range, bearing, and velocity of targets 30 and 32 as well as other features of targets 30 and 32 such as the relative target size. In some examples, the radar system may be a FMCW millimeter wave (MMW) radar system which transmits radar signal 50 and receives the reflected return at the same time.

In the example of FIG. 1, target 30 is be a ship or boat moving in the same direction as aircraft 10. In this example, target 30 may have a constant bearing relative to aircraft 10 and therefore only a radial velocity relative to aircraft 10. In other examples, target 30 may be moving in the opposite direction toward aircraft 10 and have a similar radial velocity relative to aircraft 10. Similarly, target 32 may be moving with a speed and direction such that aircraft 10 detects a constant bearing and decreasing range. In this example, target 32 may only have a radial velocity relative to aircraft 10.

Receiver electronics in the radar system may process the reflected signal received by the radar antenna to determine the radial velocity of target 30. In the example of an FMCW radar system using a sawtooth modulation pattern of frequency ramps, the receiver electronics may mix a portion of the transmitted radar signal 50 with the received signal. Because the received signal is time delayed from the transmitted radar signal 50, the mixer output may yield a beat signal that include frequencies lower than either the transmitted or reflected radar signal. For example, the transmitted and received signal may be in GHz range, such as 95 GHz. The beat signal frequencies may be in the MHz range, or lower. The beat signal frequencies may be low enough to sample and digitize with an ADC. For example, an ADC below the sampling Nyquist frequency, which is half the sample frequency. As one example, an ADC with a sample frequency of 8 MHz may sample a beat signal that includes frequencies 4 MHz and below without encountering aliasing.

The beat signal frequencies will be proportional to the target distance from aircraft 10 and relative velocity to aircraft 10. In other words, for a given target, such as target 30, the beat signal frequency may include both a distance frequency component and a velocity frequency component, according to the following equation:

$$f_{beat} = f_{distance} + f_{Doppler}$$

The receiver electronics may determine a usable number of digitized samples and divide these samples into a number of sample subsets within a single frequency ramp. The receiver electronics may use an FFT to determine the frequency content of each subset. By processing several subsets of samples over at least two frequency ramps, the receiver electronics may separate the distance frequency component from the velocity or Doppler frequency component. In this way the radar system receiver electronics may use the Doppler frequency component of the beat frequency to determine the radial velocity of target 30.

The radar system of FIG. 1 using the techniques of this disclosure may have advantages over some other radar systems. By dividing the sampled reflected radar signal into subsets of samples, the radar system may be able to determine the Doppler frequency, and therefore the target velocity of target 30 with large differences in the Doppler ambiguity. Additionally, a radar system according to this disclosure may determine target velocity while continuing normal surveillance functionality. In other words, the radar system may determine target velocity without using a special mode and therefore the radar system may remain available for other tasks, such as searching, tracking etc. Therefore, the radar system may continue normal surveillance and other functions and keep the radar frequency parameters the same while determining target radial velocity. In other words, the radar system maintains the same radar frequency parameters for surveillance functions as for determining target velocity.

In a normal surveillance mode, the radar system may transmit radar signal 50 in a radiation pattern such that the radar system may search for and track targets and structures. A "normal surveillance mode" may differ between one radar system to another. In some examples a radar system may scan with a narrow beam and a rapid search rate while in other examples a radar system may use a wider beam and slower search rate. Example search patterns may include a three-dimensional sweep pattern, a conical search pattern or some other search pattern.

Figure 2:
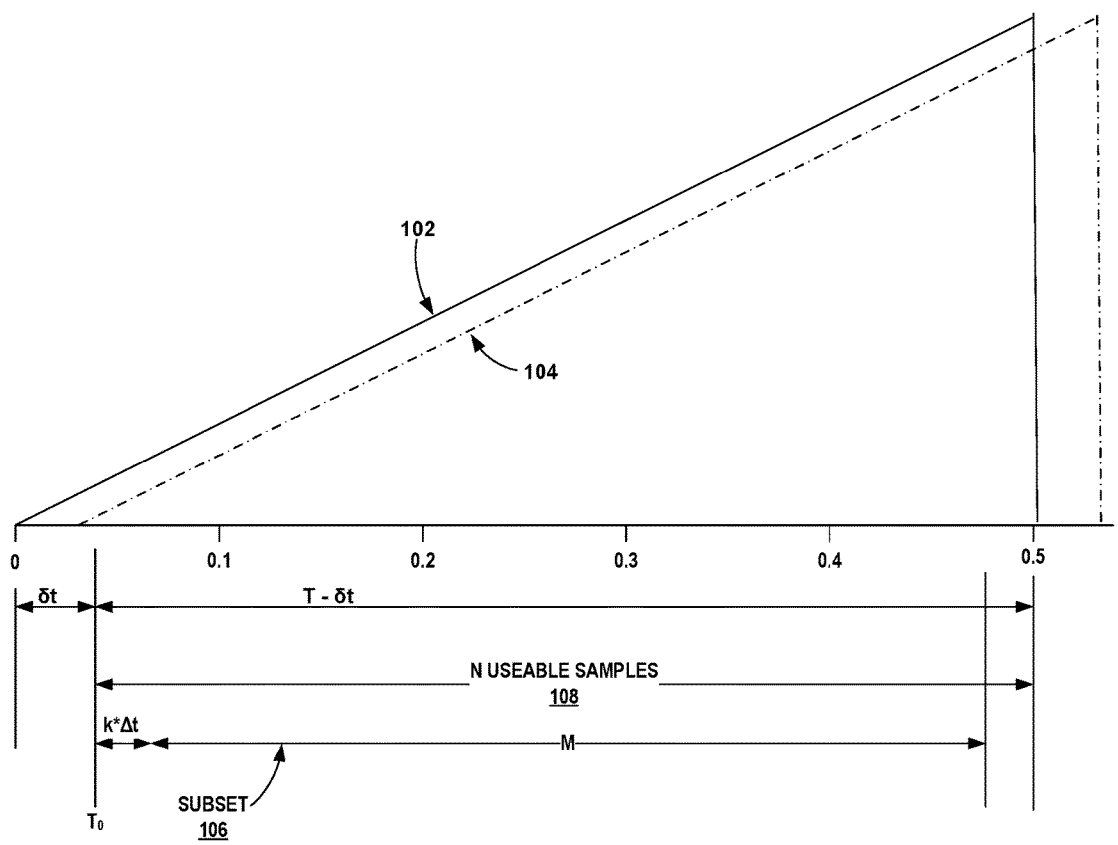
FIG. 2 is a conceptual diagram illustrating an example FMCW radar frequency ramp with N usable ADC samples divided into subsets of M samples in accordance with one or more techniques of this disclosure.

FIG. 2 is a conceptual diagram illustrating an example FMCW radar frequency ramp with N usable ADC samples that may be divided into subsets in accordance with one or more techniques of this disclosure. The radar system in the example of FIG. 2 uses a sawtooth frequency ramp modulation scheme.

The techniques of this disclosure recognize that the concept of high PRF and short intra-pulse time may apply to an FMCW radar system to determine target velocity. The FMCW radar transmitted signal 102, in the example of FIG. 2 is modulated with a linear frequency ramp. The received signal 104 is time-delayed by the time required for the transmitted radar signal to travel from the radar to the target and the reflected signal to travel back. The receive electronics mix the received signal with the transmitted signal to extract a beat signal. The beat signal frequency is proportional to the distance to the target. The beat signal frequencies are much lower than a baseband frequency of the radar. An analog-to-digital converter (ADC) may sample the beat signal. The receiver electronics may apply a fast Fourier transform (FFT) to the ADC output to identify target frequencies in the digital signal. The FFT may be implemented by software or by hardware such as an application specific integrated circuit (ASIC) or a field programmable gate array (FPGA).

In the example of FIG. 2, the frequency ramp of the FMCW radar transmitted signal 102 extends over a period T, and the received signal also extends over the same period T. The received signal 104 may be delayed by a time as long as the time for the radar signal to travel to a target at the maximum distance and back. This delay means that during the beginning of a frequency ramp an FMCW radar system with a sawtooth frequency ramp modulation scheme may receive the return signal from the end of the previous frequency ramp. Therefore, there is an interval, δt, at the beginning of each frequency ramp when the radar system may receive frequencies from more than one frequency ramp. In other words, the part of the frequency ramp period T that excludes the interval δt, i.e. the interval of T−δt, includes frequencies that are within a single frequency ramp. Therefore, the portion of the received signal in the interval of T−δt also contains only a combination of frequencies from one or more targets.

Determining the frequencies of the portion of the received signal in the interval of δt may make the signal processing significantly more complex. This will be explained in more detail in FIGS. 4A and 4B below. Determining the frequencies in the interval of T−δt may require less complex processing and only include a combination of frequencies from one or more targets. Therefore, to determine the target velocity, the most usable portion of the received signal is this interval of T−δt. The samples in the interval of δt may be usable for other analysis but are less useful for determining target velocity, as described above. The usable interval and advantages of using this interval will also be explained in more detail below in FIGS. 4A and 4B.

The interval T−δt may include N usable samples 108. The number of samples over a period of time depends on the ADC sample frequency. A faster ADC sample frequency has a smaller ADC sample period, Δt. As one example, an ADC with a sample frequency of 12 MHz has a sample period Δt=83 nanoseconds (ns). To overcome the Doppler ambiguity, described above, the techniques of this disclosure include dividing the usable interval of N samples 108 into subsets 106. Each subset 106 may include M samples. Choosing different subsets 106 of M samples from the N usable samples 108 may be equivalent to choosing the intra-pulse time of a pulsed radar.

Applying a FFT to a subset of M samples may determine the frequencies in the sample most efficiently if the sample size is some power of two such as, M=128 ($2^7$) samples, M=512 ($2^9$) samples, M=16 ($2^4$) samples, and so on. A larger subset 106 with a larger M would include a larger frequency range and may yield improved range resolution. In some examples the subset 106 of M samples may be the largest power of two number that is less than or equal to the N usable samples 108. For example, a frequency ramp with period T that has 10,000 samples, the largest power of 2 samples that fits is 8192=$2^{13}$. Excluding the interval δt may exclude, as one example, 300 samples, leaving 10,000−300=9700=N usable samples. Selecting M=8192 for this example leaves 9700−8192=1508 possible values for k. In other words, for M=8192 in this example means the radar system may analyze up to 1508 subsets (106) of M samples.

In other examples, there may be advantages to analyzing more subsets 106 for a given frequency sweep. Selecting M=4096=$2^{12}$, in the example above means the radar system may analyze up to 9700−4096=5604 subsets. Said another way, this leaves 5604 possible values for k, as depicted in the example of FIG. 2. In this manner the radar system may sample the phase evolution of the received signal from a target over 5604 samples. In some examples additional subsets 106 may yield better noise performance and improved phase measurement. Better noise performance may be useful in a noisy environment with multiple moving targets as well as targets that have a dim radar reflection or have extended or unusual shapes. This may occur in a military application when tracking camouflaged targets or targets designed to minimize radar return.

A smaller M, e.g. 4096 instead of 8192, may yield a lower range resolution, which may balance against the improved noise performance. Note that range resolution also depends on the baseband frequency of the radar. As one example, a 94 GHz baseband radar would have a range resolution of approximately one meter. Also, a smaller M with fewer samples results in a smaller FFT, which may be less computationally intensive and result in increased computational throughput. Also, the range resolution tolerance for target velocity calculations may be more relaxed than for other radar requirements. Therefore, in some examples, a radar system may reduce size of the FFT for target velocity calculations which may also allow increased computational throughput.

To select multiple subsets 106 of M samples within a frequency ramp, the radar system, as shown in the example of FIG. 2, offsets each subset 106 by a multiple, k, of the ADC sample period Δt, where k is an integer. FIG. 2 depicts $T_0$ as the time after the interval δt. Therefore, the received signal after $T_0$ may contain only frequencies from within the single frequency ramp as shown. A first subset 106 of M samples may start at $T_0$, and therefore where k=0. A second subset 106 of M samples may shift the start point by one ADC sample period Δt, where k=1. A third subset 106 of M samples may start 12*Δt later (k=12). At the ADC output, shifting the subsets 106 by k*Δt shifts the subset 106 by k samples within the N usable samples 108.

By selecting a series of subsets 106 within a single frequency ramp in this manner, we can directly sample the phase evolution of the received signal from a target. In other words, as the target, such as target 30 shown in FIG. 1, moves with a radial velocity relative to the radar system, the received signal frequency may change both because of the frequency ramp and the Doppler frequency. Isolating the Doppler frequency may allow the radar system to determine the target velocity.

The Doppler ambiguity between the subsets 106 is proportional to the 1/Δt. As one example, a 12 MHz ADC may take samples every 83 ns, which could make the ambiguity between the possible velocities approximately 5000 m/s. If the target were a boat, a Doppler ambiguity of 5000 m/s makes it easy to distinguish a reasonable target velocity from an unrealistic target velocity. A radar system may calculate the boat's Doppler velocity as either 5 m/s (18 km/hr or about 10 knots) or 5005 m/sec (18,000 km/hr). As a boat is not likely to be able to travel at 18,000 km/hr, the radar system may discard the unreasonable velocity and display the actual target velocity as 18 km/hr. In this manner a radar system operating according to the techniques of this disclosure may unambiguously determine a target's velocity.

Figure 3:
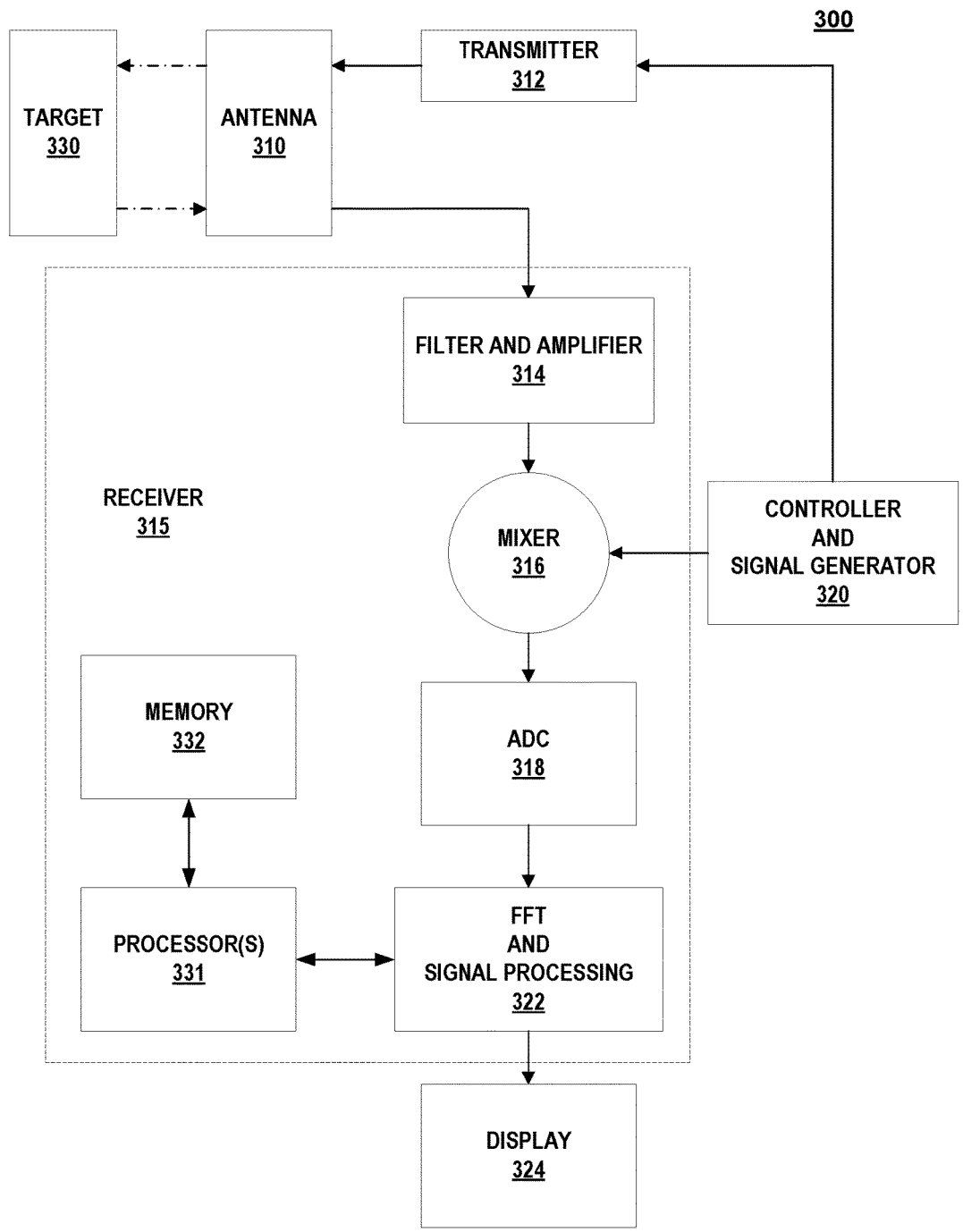
FIG. 3 is a conceptual block diagram illustrating an example radar system that may determine an unambiguous target radial velocity while operating in normal surveillance mode, in accordance with one or more techniques of this disclosure.

FIG. 3 is a conceptual block diagram illustrating an example radar system that may determine an unambiguous target radial velocity while operating in normal surveillance mode, in accordance with one or more techniques of this disclosure. One example of radar system 300 may include an FMCW MMW radar system which transmits a radar signal and receives the reflected return at the same time.

Radar system 300 may include antenna 310, transmitter electronics 312, receiver electronics 315, controller and signal generator 320, and display 324. Receiver electronics 315 may include filter and amplifier 314 mixer 316, ADC 318, FFT and signal processing unit 322. FIG. 3 depicts one possible example of radar system 300 to explain the techniques of this disclosure. A radar system according to the techniques of this disclosure may include other configurations. For example, controller and signal generator 320 and FFT and signal processing unit 322 may be combined as a single block controlled by a single processor.

Radar system 300 may be installed in a stationary ground installation or in any type of vehicle, such as aircraft 10 shown in FIG. 1. Radar system 300 may include a normal surveillance mode used to search for targets, weather or terrain features. Radar system 300 may search for and track targets 330 for collision avoidance or for military purposes such as intelligence collection or ordnance delivery. Radar system may display terrain features for navigation, confirmation of ground speed and altitude or other purposes.

Antenna 310 may a transmit radar signal from transmitter electronics 312 and transmit the radar signal in a radiation pattern such that the radar system may search for and track targets and structures. This radiated transmit radar signal may be similar to transmit radar signal 50 shown in FIG. 1. Antenna 310 may receive a portion of the reflected signal and send the received signal to receiver electronics 315.

Target 330 may include ground vehicles, terrain, watercraft, aircraft, weather and other similar reflectors of a transmitted radar signal. Target 330 may move laterally or radially relative to the location of radar system 300 and antenna 310. Targets with movement that include a radial component may have a Doppler effect on the frequency of the reflected radar signal.

In the example of FIG. 3, receiver electronics 315 may receive the radar return signal from antenna 310. Receiver electronics 315 may include filter and amplifier 314, mixer 316, ADC 318, FFT and signal processing unit 322, one or more processors 331 and memory 332.

Filter and amplifier 314 may filter, amplify and otherwise process the reflected return signal. In the example of an FMCW radar, the receiver electronics may continuously receive a reflected signal at the same time antenna 310 transmits the radar signal.

Mixer 316 receives the amplified and processed return signal from filter and amplifier 314 and mixes the return signal with a portion of the transmitted signal received from controller and signal generator 320. The return signal has a time delay proportional to the travel time from antenna 310 to and from target 330. The output of mixer 316 is therefore a beat signal that includes frequency components resulting from the time delay as well as any Doppler shift resulting from any radial velocity of target 330 relative to antenna 310. As described above for FIG. 1, the beat signal frequency for a target may include a distance component and velocity component according to the following equation:

$$f_{beat} = f_{distance} + f_{Doppler}$$

The beat signal may also include other components, such as noise, which are omitted for clarity. The beat signal from mixer 316 is low enough to be sampled and digitized by ADC 318. ADC 318 sample rate should be above the Nyquist frequency for the beat frequency to avoid aliasing. As one example, an ADC with a sampling rate of approximately 12 MHz may provide adequate resolution for a 90 GHz MMWR to accurately and unambiguously determine the radial velocity of target 330. In this disclosure the term "approximately" indicates the value is as stated within measurement, manufacturing and physical tolerances.

Controller and signal generator 320 may include one or more processors, or in some examples receive instructions from processors 331. Examples of a processor may include any one or more of a microprocessor, a controller, a digital signal processor (DSP), an ASIC, a FPGA, a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Processors 331 may execute programming instructions stored in memory 332. Processors 331 may also store results of equations, intermediate values, constants or other information in memory 332. In some examples, receiver electronics 315 may not have separate processors 331 and memory 332. In these examples FFT and signal generator 322 may execute the functions of processors 331. In another example, receiver electronics 315 may receive processing instructions from controller and signal generator 320.

Controller and signal generator 320 may also include components such as a voltage controlled oscillator (VCO) and other components to generate a transmitted radar signal. Controller and signal generator 320 may send the transmitted radar signal to transmitter electronics 312 for amplification and other signal processing as well as to mixer 316.

FFT and signal processing unit 322 may determine a set of usable samples from the output of ADC 318 and further subdivide the usable samples into subsets. By selecting the subset size to be small enough, FFT and signal processing unit 322 may obtain a sequence of constant phase differences, and obtain the target velocity directly.

In the example of an FMCW radar with a sawtooth modulation scheme, the transmitted frequency ramp extends over a period T as described above in FIG. 2. The received radar return signal also extends over the same period T, with a time delay that can be as long as the time for the radar signal to travel to the maximum target distance and back. The usable interval of T−δt described above in FIG. 2 at the output of the ADC includes samples with just the combination of frequencies from the targets. This usable interval of T−δt will be described in more detail with respect to FIG. 4A below. The usable interval T−δt sampled by the ADC includes some number N of usable samples. FFT and signal processing unit 322 may further divide these N usable samples into subsets. Each subset may include M usable samples for input into the FFT to measure the frequencies.

Computationally, the FFT is most efficient when M is a power of two. Choosing different sets of M samples from the N usable samples may be equivalent to choosing the intrapulse time of a pulsed radar, as described above. In this manner, FFT and signal processing unit 322 may directly sample the phase evolution of the received signal from target 330. Each subset is shifted by a multiple Δt, a time interval that is substantially smaller than the period T of the frequency ramp (or of the pulsed radar). This may allow FFT and signal processing unit 322 to extract, without ambiguity, the Doppler velocity of a target.

Display 324 may be any display operatively coupled to the other components of radar system 300. Display 324 may receive a signal from FFT and signal processing unit 322 that causes display 324 to depict target location, speed, terrain features and other information determined by radar system 300.

Figure 4A:
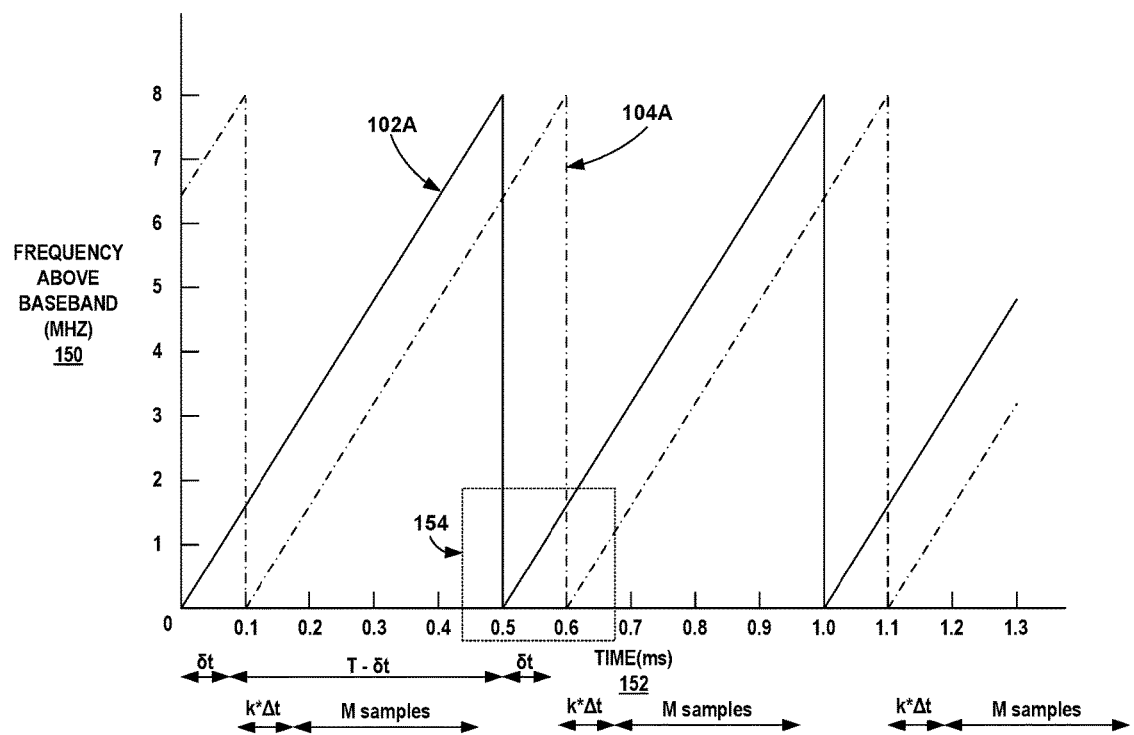
FIG. 4A illustrates more than one cycle of an example sawtooth frequency ramp modulation scheme for an FMCW radar system.
Figure 4B:
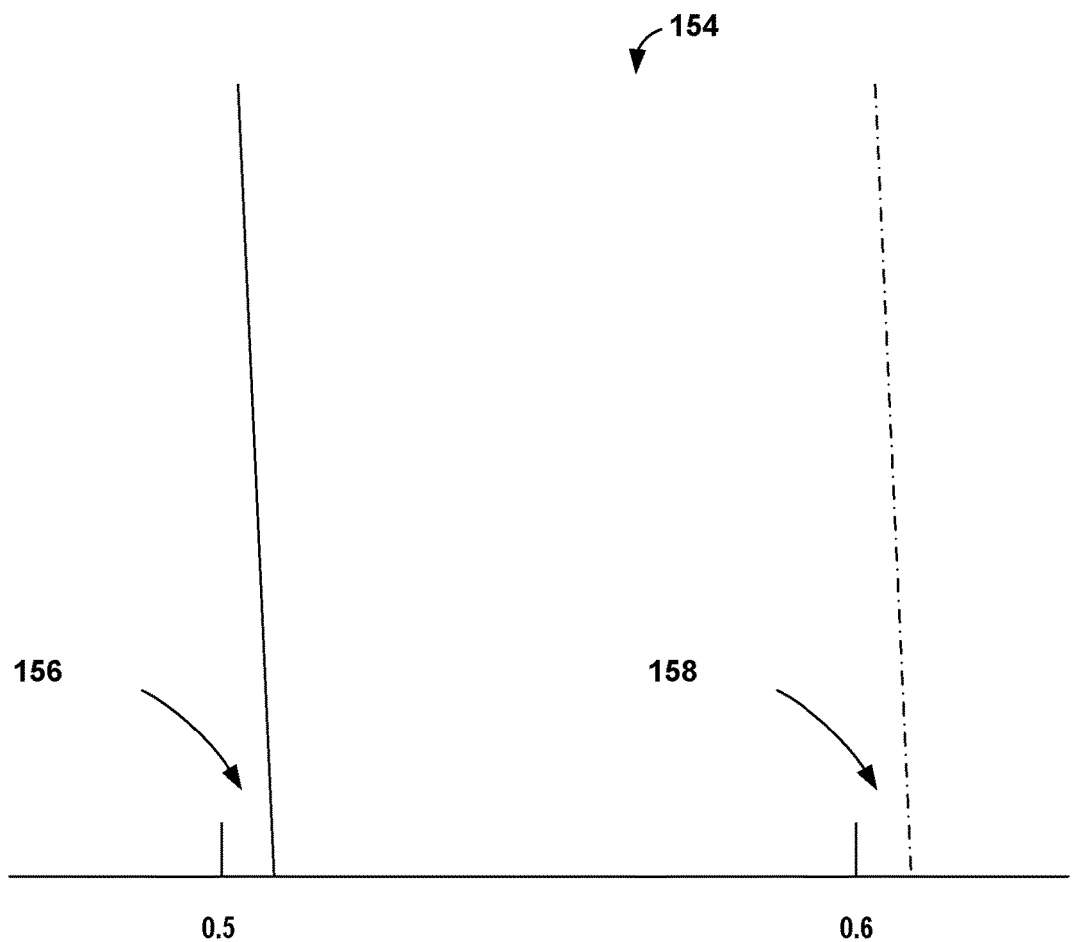
FIG. 4B depicts a close-up view of a portion of FIG. 4A illustrating a time delay as the frequency ramp resets to the baseband frequency.

FIG. 4A illustrates more than one cycle of an example sawtooth frequency modulation scheme for an FMCW radar system. FIG. 4B depicts a close-up view of portion 154 of FIG. 4A illustrating a delay as the frequency ramp resets to the baseband frequency.

FIG. 4A depicts a radar transmitted signal 102A and a radar received signal 104A over a timeframe of 1.3 milliseconds, as shown by time axis 152. The FMCW radar transmitted signal 102A is modulated by a linear frequency ramp, as described above for FIG. 2. In the example of FIG. 4A, the frequency ramp modulates radar transmitted signal 102 from a baseband frequency to a frequency 800 MHz above baseband, as shown on the Y-axis 150. The baseband can be any radar frequency including MMWR as described above. For example, the transmitted signal 102A of a 90 GHz baseband radar system may range from 90 GHz at the beginning of a ramp to 90.8 GHz at the maximum or peak transmitted frequency. The sawtooth frequency ramp of 800 MHz in the example of FIG. 4A is simply one possible example of a modulation scheme. The frequency ramp modulation scheme may have advantages when tracking multiple targets.

The received signal 104A is time-delayed by the time-of-flight from the radar to the target and back. Received signal 104A may have a different frequency range than the transmitted signal 102A because of the Doppler effect. For example, a radar system installed on aircraft 10, shown in FIG. 1A may have a higher peak frequency in received signal 104A, than in transmitted signal 102A, if a target is moving toward aircraft 10.

FIG. 4A depicts a frequency ramp with a period T=0.5 ms and a repetition rate of 0.5 ms. The interval δt depicts an interval at the beginning of each frequency ramp where the radar system receiver electronics may be receiving the time delayed signal from the previous frequency ramp. Also, as shown by portion 154 in FIG. 4A, and in more detail in FIG. 4B, the interval δt includes a delay at the end of each frequency ramp. Referring to FIG. 4B, the radar system transmission electronics may not be able to instantaneously shift from 800 MHz above baseband to zero MHz above baseband. Transmitted signal 102A may not reach baseband at exactly 0.5 ms, but may have a delay 156 of approximately a microsecond (μs) in some examples. A delay 156 in transmitted signal 102A may result in a similar delay 158 in received signal 104A.

Processing the signals in interval δt may require complex circuitry, algorithms or both to account for both the physical delay in switching from the peak above baseband to baseband as well as the time delayed portion from a previous frequency ramp. Therefore, in some examples, a radar system receiver electronics may exclude samples in the interval δt when analyzing the reflected return signal for target velocity. The interval δt may be considered a transition time at the beginning of a frequency ramp. The remainder of the period T of the frequency ramp, e.g. T−δt may include a usable number of samples at the output of the ADC. In other words, the usable number of samples may be considered a usable interval of the frequency ramp period T for the purpose of determining the target velocity. The usable number of samples may also be considered to be those samples from δt after the start of the frequency ramp to the maximum frequency of the frequency ramp. Other functions of the radar system may use the entire frequency ramp or multiple frequency ramps to perform these other functions, but use only the interval T−δt to determine target velocity.

A radar system may further divide this usable number of samples into subsets of M samples, as described above. The example of FIG. 4A depicts δt<0.1 ms for clarity and convenience of explanation. However, δt may include a shorter, or longer interval, depending on the radar system baseband frequency, power, range and other factors. As one example, a radar system may determine that δt=300 samples. Therefore, the start point of the first subset of M samples may be at sample 301. The end point of period T may include the maximum frequency or peak frequency of the frequency ramp.

For the example of FIG. 4A with a frequency ramp period of T=0.5 ms, and an example ADC sample rate of 12.5 MHz, a frequency ramp may include 6250 samples (1250 samples per 0.1 ms). In this example the N usable samples in the interval T−δt=6250−300=5950 samples. The number of samples in the interval δt=300 is a convenient value for this example. One choice of FFT may be to select a subset with $M=2^{12}=4096$, beginning at sample 301. This choice may offer good range resolution, and allow up to 5950−4096=1854 values for k, similar to the example discussed above.

Another choice of FFT may be to select $M=2^{11}=2048$, which would increase the number of subsets, or time measurement samples. In this example, receiver electronics 315 may process up to 5950−2048=3902 subsets. As discussed above more subsets, or time measurement samples may have advantages of improved phase measurement and improved noise performance. Selecting a smaller subset, may also result in a smaller FFT, which may be less computationally intensive and result in increased computational throughput. A smaller FFT may also impact range resolution and may be balanced against improved velocity measurements and improved computational performance. Also, the range resolution tolerance for target velocity calculations may be more relaxed than for other radar requirements. Therefore, in some examples, a radar system may reduce size of the FFT for target velocity calculations which may also allow increased computational throughput.

In this example, radar system selects subsets of samples that create a number of sequential time measurements, which are similar to sequential pulses for a pulsed radar. One difference is the $\Delta T_{meas}$ for a pulse radar is relatively large. As discussed above, the offset between the subsets, in some examples, are equal to the ADC sample period. The Doppler ambiguity is proportional to the inverse of the ADC sample period (1/Δt) and Δt is substantially smaller than the period T of the frequency ramp. A radar system implementing the techniques of this disclosure may sample the phase evolution of the received signal from a target, such that the Doppler ambiguity differences will be large. This may allow the radar system to select a valid Doppler velocity from among the several possible velocity solutions. In this manner, the radar system may extract the Doppler velocity of a target without ambiguity.

A sawtooth frequency ramp modulation scheme may have advantages when resolving Doppler velocity for a plurality of targets when compared to other modulation schemes such as sinusoidal or triangle modulation. For example, a triangle modulation scheme may be useful when a radar system is processing a single target. For example, a vehicle collision avoidance radar system, in some examples, may determine the movements of only the vehicle or obstacle in front of the car that contains the vehicle collision avoidance radar system. However, a radar system with a triangle modulation scheme may need to resolve ambiguity between the ascending ramp and the descending ramp of the triangle modulation, which may require more complex processing. A sawtooth, frequency ramp modulation scheme may have advantages when tracking multiple targets to simplify the signal processing because a sawtooth modulation scheme avoids the ambiguity of a descending ramp.

In some examples, a radar system using the techniques of this disclosure may determine the one or more frequencies within subsets of more than one frequency ramp. For example, the radar system may determine the frequencies in the subsets of a first frequency ramp as well as the frequencies of subsets within a second or third frequency ramp. Determining the frequencies across subsets of several frequency ramps may provide advantages in some examples, such as for a target that is rapidly changing speed and direction.

An additional application for this technique is the measurement of the forward velocity of the radar platform, based on the returns from the ground features, such as mountains or a coastline. By careful consideration of how the phase of the returns shifts as a function of distance and azimuth, a highly accurate ground speed may be obtained without ambiguity. The ground speed measurement may be useful in helping to correct navigation drift in GPS-denied applications.

Figure 5:
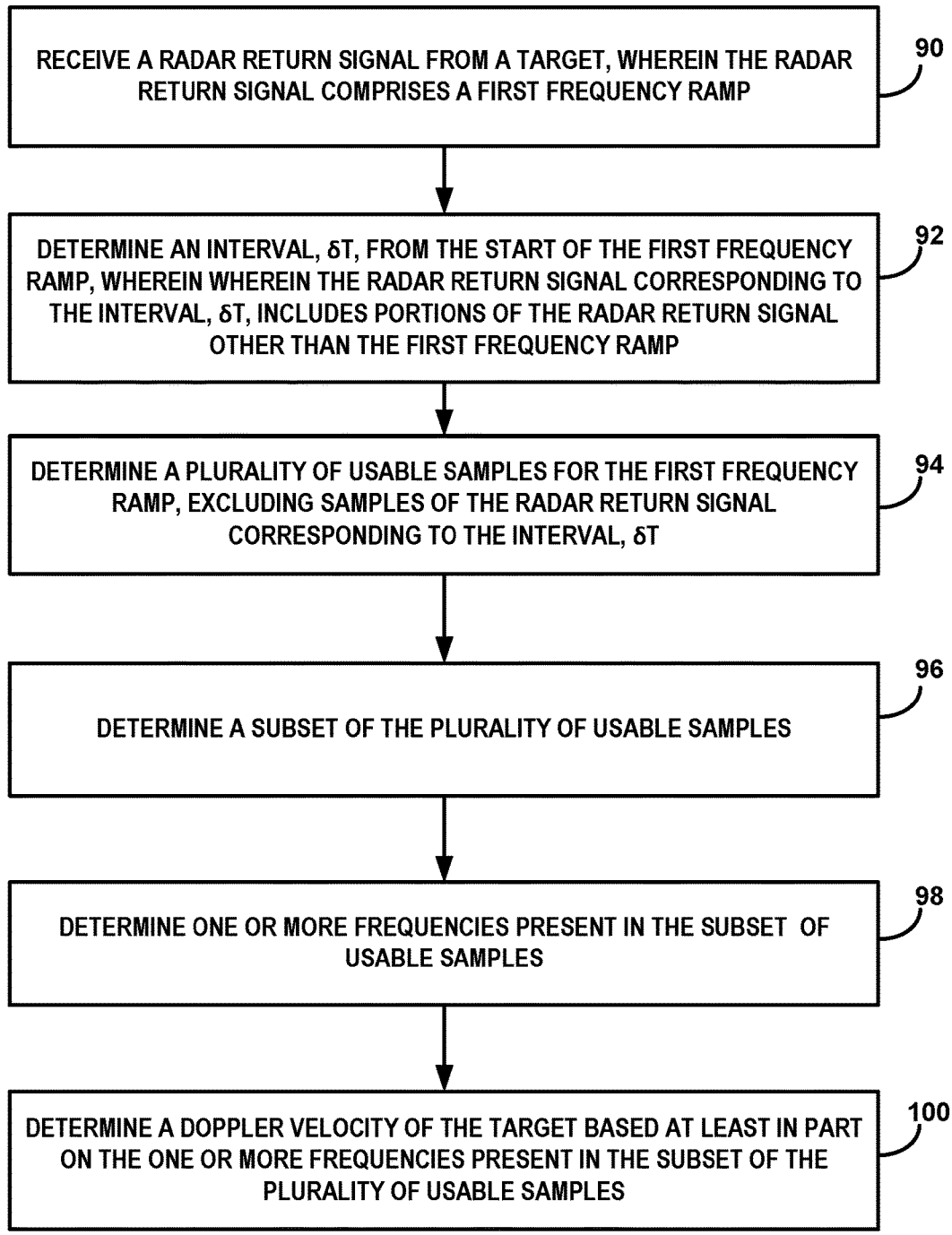
FIG. 5 is a flow chart illustrating an example mode of operation of a radar system that determines the Doppler velocity of a target in accordance with one or more techniques of this disclosure.

FIG. 5 is a flow chart illustrating an example mode of operation of a radar system that determines the Doppler velocity of a target in accordance with one or more techniques of this disclosure. The flowchart of FIG. 5 will be described with respect to of FIGS. 1-4B.

A radar system, such as radar system 300 shown in FIG. 3, may receive a radar return signal from a target, wherein the radar return signal comprises a first frequency ramp (90) as shown in FIG. 4A. The reflected return signal, received signal 104A, may be time delayed from the transmitted signal 102A. Receiver electronics 315 may receive the reflected return signal from antenna 310 and amplify and filter the return signal along with other signal processing. Filter and amplifier 314 may output the processed return signal to mixer 316.

Radar system 300 may include one or more processors. In the example of FIG. 3, the one or more processors may be included as part of controller and signal generator 320 or FFT and signal processing unit 322. In some example radar systems, controller and signal generator 320 and FFT and signal processing unit 322 may be controlled by the same processor. The output of mixer 316 is a beat signal, which ADC 318 digitizes into a plurality of samples.

Samples in the interval δt may include portions of the received radar signal other than from a given ramp. For example, as described above for FIG. 4A, antenna 310 may receive the reflected radar return signal from the end (peak frequencies) of a first ramp near the beginning of a second ramp because of the time delay traveling to and from target 330. Mixer 316, in this example, mixes the final portions of the first ramp received signal with the starting portions of the second ramp. Mixer 316 outputs this portion of the received signal to ADC 318. Therefore, at the output of ADC 318, the samples in the interval δt at the start of the second ramp may include portions of the return signal from the first ramp, which is not part of the second ramp. Radar system 300 determines the interval, and the number of samples in interval δt (92), which may be a function of the modulation scheme, period T of the frequency ramp and maximum range of the radar system.

Radar system 300 may determine a plurality of usable samples for the first frequency ramp that excludes samples from within the interval δt (94). As shown above in FIGS. 2 and 4B, the usable number of samples, N, may be included in the interval T−δt at the output of ADC 318.

FFT and signal processing unit 322 within radar system 300 may determine a subset of usable samples (96) of size M. As described in detail in FIG. 2, the size of subset 106 may be a power of two, for FFT efficiency. Other factors in determining the size and number of samples M in subset 106 include the degree of range resolution and the total number of usable samples N to allow enough time shifted subsets for good noise and phase measurement performance.

FFT and signal processing unit 322 may further determine one or more frequencies present in the subset of usable samples (98). A smaller subset 106 may result in a smaller FFT, which may be less computationally intensive but may also reduce range resolution. The range resolution tolerance for target velocity calculations may be more relaxed in some examples and therefore a smaller subset 106 may have limited impact on range resolution.

Radar system 300 may determine a Doppler velocity of the target based at least in part on the one or more frequencies present in the subset of usable samples (100). Example radar system 300, operating in accordance with techniques of this disclosure, may overcome the solution ambiguity by making multiple measurements within a single frequency ramp. Radar system 300 may also overcome Doppler ambiguity extending the measurements in time using subsets 106 offset by an amount as small as the ADC sample period. The ADC sample period is significantly less than the period of a frequency ramp. In this manner, radar system 300 may extract, without ambiguity, the Doppler velocity of a target. This has the advantage of leaving the radar system free to conduct other functions because the radar system may gather the Doppler velocity information during a normal scan pattern. Unlike a pulsed radar, for example, an FMCW radar in accordance with the techniques of this disclosure, may continue its normal scan pattern with no need to "stare" at a target, or to change PRF or frequency sweep parameters to resolve the Doppler ambiguity.

In one or more examples, the functions described above may be implemented in hardware, software, firmware, or any combination thereof. For example, the various components of FIG. 3, such as receiver electronics 315 and controller and signal generator 320 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media, such as memory 332, can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein, such as processors 331 or controller and signal generator 320, may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A radar system comprising:
 radar transmit electronics configured to transmit a radar signal; and
 radar receive electronics configured to:
  sample a radar return signal received from a target;
  determine an interval from a start of a first frequency ramp of the radar return signal, wherein a portion of the radar return signal corresponding to the interval includes portions of the radar return signal other than the first frequency ramp;
  determine a plurality of usable samples for the first frequency ramp, wherein the plurality of usable samples excludes samples of the radar return signal corresponding to the interval;
  determine a subset of the plurality of usable samples, within the first frequency ramp;
  determine one or more frequencies present in the subset of the plurality of usable samples; and
  determine a Doppler velocity of the target based at least in part on the one or more frequencies present in the subset of the plurality of usable samples, within the first frequency ramp.

2. The radar system of claim 1, further comprising:
 an analog-to-digital converter (ADC) with an ADC sample period, wherein:
  the subset of the plurality of usable samples is a first subset of the plurality of usable samples of the first frequency ramp, and
  a second subset of the plurality of usable samples of the first frequency ramp includes k samples not included in the first subset, wherein k is an integer; and
 the radar receive electronics are further configured to determine the Doppler velocity of the target based at least in part on the one or more frequencies present in the first and the second subsets of the plurality of usable samples of the first frequency ramp.

3. The radar system of claim 2, wherein the first subset and the second subset included approximately the same number of usable samples.

4. The radar system of claim 2, wherein the second subset includes a plurality of usable samples that are also in the first subset.

5. The radar system of claim 2, wherein the radar receive electronics are further configured to determine the Doppler velocity of the target based at least in part on the one or more frequencies present in the first and second subsets of the plurality of usable samples of the first frequency ramp and a first subset and a second subset of a plurality of usable samples of a second frequency ramp.

6. The radar system of claim 2, wherein the radar receive electronics are further configured to determine the one or more frequencies present in the first and the second subset of the plurality of usable samples by fast Fourier transform (FFT).

7. The radar system of claim 1, wherein the radar system comprises a frequency modulated continuous wave (FMCW) millimeter wave (MMW) radar system.

8. The radar system of claim 5, wherein the radar receive electronics are further configured to determine the Doppler velocity of the target while the radar system maintains the same radar frequency parameters for surveillance functions as for determining target velocity.

9. The radar system of claim 1, wherein the plurality of usable samples includes samples from the start of the first frequency ramp to a maximum frequency of the first frequency ramp, excluding samples in the interval.

10. A method of determining velocity, the method comprising:
 receiving a radar return signal from a target, wherein the radar return signal comprises a first frequency ramp;
 determining an interval from a start of the first frequency ramp of the radar return signal, wherein a portion the radar return signal corresponding to the interval includes portions of the radar return signal other than the first frequency ramp;
 determining a plurality of usable samples for the first frequency ramp, wherein the plurality of usable samples exclude samples of the radar return signal corresponding to the interval;
 determining a subset of the plurality of usable samples, within the first frequency ramp;
 determining one or more frequencies present in the subset of the plurality of usable samples; and determining a Doppler velocity of the target based at least in part on the one or more frequencies present in the subset of the plurality of usable samples, within the first frequency ramp.

11. The method of claim 10, wherein the subset of usable samples is a first subset of the plurality of usable samples of the first frequency ramp, the method further comprising:
determining a second subset of the plurality of usable samples of the first frequency ramp, wherein the second subset of usable samples includes k samples not included in the first subset, wherein k is an integer, and
determining a Doppler velocity of the target based at least in part on the one or more frequencies present in the first and the second subsets of the plurality of usable samples.

12. The method of claim 11, wherein the first subset and the second subset, within the first frequency ramp, include approximately the same number of usable samples.

13. The method of claim 11, wherein the second subset includes a plurality of usable samples that are also in the first subset.

14. The method of claim 11, wherein determining the one or more frequencies present in the first subset and the second subset of the plurality of usable samples comprise applying a fast Fourier transform (FFT) to the first and the second subsets of the plurality of usable samples.

15. The method of claim 11, wherein determining, by the processor, a Doppler velocity of the target further comprises determining the Doppler velocity of the target based at least in part on the one or more frequencies present in the first and the second subsets of the plurality of usable samples for the first frequency ramp and one or more frequencies present in a first subset and a second subset of a plurality of usable samples for a second frequency ramp.

16. The method of claim 10, wherein the interval comprises a transition time at a beginning of the first frequency ramp.

17. The method of claim 10, wherein the interval is a first interval and the plurality of usable samples includes samples corresponding to a second interval, $T-\delta t$, wherein T is a period of the first frequency ramp and the first interval is $\delta t$, which is an interval of time less than T.

18. A radar system comprising:
means for receiving a radar return signal from a target, wherein the radar return signal comprises a first frequency ramp;
means for determining an interval, from a start of the first frequency ramp of the radar return signal, wherein the portion of the radar return signal corresponding to the interval includes portions of the radar return signal other than the first frequency ramp;
means for determining a plurality of usable samples for the first frequency ramp, wherein the plurality of usable samples exclude samples of the radar return signal corresponding to the interval;
means for determining a subset of the plurality of usable samples, within the first frequency ramp;
means for determining one or more frequencies present in the subset of the plurality of usable samples;
means for determining a Doppler velocity of the target based at least in part on the one or more frequencies present in the subset of the plurality of usable samples, within the first frequency ramp.

19. The radar system of claim 18, wherein the subset of usable samples is a first subset of the plurality of usable samples of the first frequency ramp, the radar system further comprising:
means for determining a second subset of the plurality of usable samples of the first frequency ramp, wherein the second subset of usable samples includes k samples not included in the first subset, wherein k is an integer, and
means for determining a Doppler velocity of the target based at least in part on the one or more frequencies present in the first and the second subsets of the plurality of usable samples.

20. The radar system of claim 19, wherein determining, by the processor, a Doppler velocity of the target further comprises determining the Doppler velocity of the target based at least in part on the one or more frequencies present in the first and the second subsets of the plurality of usable samples for the first frequency ramp and one or more frequencies present in a first subset and a second subset of a plurality of usable samples for a second frequency ramp.

* * * * *